United States Patent Office 3,531,548
Patented Sept. 29, 1970

3,531,548
TWO-STEP POLYMERIZATION PROCESSES FOR THE PRODUCTION OF HIGH IMPACT ABS-TYPE RESINS
Gerald Goldberg, Parkersburg, W. Va., assignor to Foster Grant Co., Inc., Leominster, Mass., a corporation of Delaware
No Drawing. Filed Dec. 7, 1964, Ser. No. 416,631
Int. Cl. C08f 19/08, 19/18
U.S. Cl. 260—880                                         6 Claims

ABSTRACT OF THE DISCLOSURE

Process for producing an ABS-type polymer in which a dialkacyl peroxide is used as an initiator in an amount of 1.1% to 1.5%, a molecular weight modifier is present, and the polymerization is conducted at 65° C. to 110° C.

---

This invention relates to an improved process of forming high impact, solvent resistant polymer compositions. More particularly, this invention relates to a novel process of polymerizing monovinyl aromatic compounds and copolymerizable organonitrile compounds together with rubber materials and wherein utilization of a specific range of initiator quality produces optimum properties in the presence of molecular weight modifiers. The polymers of the present invention pertain to polymeric compositions generally termed "ABS-type" polymer compositions.

By the term "ABS-type" polymer composition is meant the normally solid copolymerizates of a monovinyl aromatic compound and an organonitrile monomer containing an effective quantity of a butadiene rubbery polymer, which can be incorporated into the copolymer as by post blending or by addition to the copolymerization mixture. These copolymeric compositions are characterized by having markedly high impact values coupled with resistance to organic solvents. Additionally, the ABS polymer compositions have high tensile and flexural strengths. Homopolymers of styrene without added rubber have comparatively low impact values and have low resistances to many organic solvents. On the other hand, styrene-acrylonitrile copolymers have resistance to solvents but represent ordinarily only a minor improvement over polystyrenes with regard to impact strengths.

ABS polymers are desirably formed by polymerization of a mixture of, e.g., the styrene and acrylonitrile compounds and rubbery butadiene polymers such as polybutadienes, butadiene-styrene copolymers, butadiene acrylonitrile copolymers or the like. Such mixtures are then polymerized under various appropriate polymerization conditions to form the high impact, solvent resistant polymer compositions identified therein as ABS polymer compositions.

It has been found desirable in the production of ABS polymers by this general procedure to incorporate into the polymerization mixture an amount of a molecular weight modifying agent. This provides in the ABS polymer products sufficiently low viscosities to give the desired good flow properties required to fabricate the polymer products into usable parts, as by use of conventional forming machines and equipment. It has also been found desirable in co-polymerizations represented by styrene and acrylonitrile copolymerization, to employ certain di-alkacyl peroxide catalysts. However, conventional procedures utilizing these catalysts applied to ABS production have not provided ABS-type polymers having sufficiently high impact values coupled with other desired properties such as high tensile values, good flow and the like.

Accordingly, the above and other objects are provided by the herein provided novel process wherein high impact, solvent resistant ABS-type polymers are produced by polymerizing a mixture of the following components:

(A) about 60 to 80 parts by weight of at least one monovinyl aromatic compound;

(B) about 20 to about 40 parts by weight of at least one nitrile compound of the following formula:

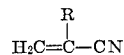

wherein R represents a member of the group consisting of hydrogen and methyl;

(C) about 5 to about 30 parts by weight of a butadiene rubbery polymer; said polymerization being initiated with a dialkacyl peroxide in which the alkacyl radical has 8 to 16 carbon atoms, in a quantity of from about 0.9% to about 1.5% by weight based on the total weight of the monovinyl and nitrile compounds and the butadiene rubbery polymers, at a polymerization temperature in the range of about 65° C. to about 110° C., preferably from about 70° C. to about 95° C.

Preferably during the polymerization, the mixture of the monovinyl aromatic compound, nitrile compound, and butadiene rubbery polymer is maintained in suspension in an aqueous medium. As those skilled in the art appreciate, aqueous suspension polymerization is distinct from aqueous emulsion polymerization.

Desirably the catalyst is lauroyl peroxide, decanoyl peroxide, caprylyl peroxide, myristyl peroxide and the like. The presently preferred catalyst is lauroyl peroxide. A presently preferred range of catalyst is from about 1.1 to about 1.5% based on the total weight of the monomers and butadiene rubbery polymer.

The butadiene rubbery polymers employed are rubbery polymeric derivatives of 1,3-butadiene, i.e., homopolymers and rubbery copolymers thereof. For example, suitable butadiene rubbery polymers are: butadiene-styrene copolymers, butadiene-acrylonitrile copolymers, butadiene-styrene-acrylonitrile terpolymers, hot and cold emulsion polybutadienes, stereoregular polybutadienes of 1,4-polybutadiene having a cis content of at least 25% and a vinyl content less than about 10%, and the like, and mixtures thereof. Preferably, the butadiene rubbery polymer is employed in the range of about 15%.

The monovinyl aromatic compounds which are employed in the practice of this invention include styrene, alpha-methylstyrene, vinylnaphthalene, and derivatives thereof which are free of nuclear substituents which interfere with the production of the desired ABS polymers of this invention.

Specific examples of such monovinyl aromatic compounds include p-methylstyrene, m-methylstyrene, p-ethylstyrene, p-isopropylstyrene, o-chlorostyrene, p-chlorostyrene, ar-dimethylstyrene, ar-dichlorostyrene, ar-methyl-or-ethylstyrene, ar-methyl-ar-chlorostyrene, ar-diethylstyrene, p-fluorostyrene, p-bromostyrene, or ar-methyl-ar-isopropylstyrene. The presently preferred vinyl aromatic compound is styrene.

Acrylonitrile is the presently preferred nitrile compound for carrying out the process herein provided.

The molecular weight modifiers are unsaturated dimers of an alpha-methylstyrene. These molecular weight modifiers may be employed generally in effective amounts of at least about 0.03%, preferably up to about 0.5%, based on the total monomer-rubbery polymer weight.

With regard the modifiers of the dimers of the alpha-methylstyrene type, method for production thereof from various alpha-methylstyrene monomers are described in U.S. Pat. No. 2,429,719. The alpha-methylstyrene monomer employed in the production of the unsaturated dimer suitable for use as a modifying agent in the process of the herein described invention can be alpha-methylstyrene which have or are free of nuclear substituents which do not substantially interfere with the modifying action of the resulting unsaturated dimers. Such nuclear substituents can be lower alkyl groups such as methyl, ethyl, isopropyl and the like, halo groups such as bromo, fluoro and chloro radicals, and the like. The alpha-methylstyrene dimer product as employed in this invention is in essence the reaction product of two molecules of the alpha-methylstyrene monomer and is a mixture of a corresponding 1-pentene and 2-pentene derivatives. When the unsaturated dimer product is formed from the presently preferred unsubstituted alpha-methylstyrene, a combination of the following active components are ordinarily obtained: 2,4-diphenyl-4-methyl-2-pentene and 2,4-diphenyl-4-methyl-1-pentene. The alpha-methylstyrene dimers are ordinarily employed in an effective amount from about 0.05% to 0.5%, preferably 0.1% to about 0.4%, based on the total monomer-rubbery polymer weight.

It has been surprisingly found as shown by the examples below that employment of the critical catalyst concentrations of the specified catalysts in conjunction with the other features of the processes provide the desired high impact values with other required properties.

This invention is applicable to a multi-step process for the production of an "ABS" polymer material. When such a process is utilized, a bulk prepolymerization technique is employed wherein polymerization of the polymerization mixture is prepolymerized to a desired conversion of, e.g., about 5 up to about 40%, ordinarily to a conversion less than about 30%. The term "conversion" as used herein refers to the percentage by weight of monomer polymerized. After the reaction mixture has reached the desired conversion, the reaction mixture is suspended in an aqueous medium and polymerization is continued to desired completion iwth a conversion of at least 70% by weight finally attained. The second or suspension polymerization stage is to be carried out at a temperature of 65° C. to 110° C. for a period of time as necessary to attain the desired degree of polymerization. Ordinarily, 2 to 10 hours is a sufficient polymerization period, depending on the various influencing factors utilized.

When suspension polymerization is employed, the specific suspending agent employed can be polyvinyl alcohol, hydroxyethyl cellulose, ammonium polyacrylate, hydroxyapatite, bentonite, and the like suitable suspending agent, used alone or in combination with other suspending agents.

In carrying out the process, other ingredients can be added to the polymerization mixture as desired, such as stabilizers, lubricants, plasticizers, colorants, and the like. Additionally, agitation and control of evaporation and atmosphere, and the like factors within the skill of the polymerization art will be utilized in producing polymers by processes of this invention.

Izod impact values are determined by ASTM (American Standard for Testing Materials) Test D 256–56. Test parts are made by procedures described in ASTM Test D 1892–61T.

In the following examples, parts are expressed by weight and percentages are based on the total weight of the butadiene rubbery polymer and monovinyl and nitrile monomers.

EXAMPLES

Several batches of the following mixture are polymerized with stirring at 90° C. for about 5 hours, using the catalysts concentrations and molecular weight modifiers in the quantities recited:

| | Parts |
|---|---|
| SBR 1006 Rubber (a commercial rubbery copolymer product sold by Goodyear Tire & Rubber Company having approximately 76% butadiene and 24% styrene) | 10 |
| Styrene | 68.4 |
| Acrylonitrile | 21.6 |
| Antioxidant | 0.2 |

The above prepolymerization mixture is suspended in aqueous medium as described below. The dialkyl peroxide catalysts are employed in the concentrations as recited in the tables. The polymerization is carried out at 75° C. for about 5 hours with agitation.

| | Parts |
|---|---|
| Prepolymerization mixture | 130 |
| Acrylonitrile | 7.9 |
| Polyvinyl alcohol suspending agent | 0.2 |
| Sodium chloride | 1.1 |
| Water | 225 |

When 10 parts of SBR rubber is employed, Izod impact employing compression molded parts desirable is at least 2.5 to 3 ft. lbs./inch notched specimens, as used in these examples.

The data set forth in Tables 1 and 2 are from runs employing 0.2 and 0.4 part of dimers of monomeric unsubstituted alpha-methylstyrene, respectively. These weights are on the basis of the total monomer-rubbery polymer weight.

Relative viscosity is determined on samples of the polymer dissolved in cyclohexanone at 25° C. (0.5000 g. in 50 g. polymer product in 50 ml. cyclohexanone).

TABLE 1

| | Run | | | | | |
|---|---|---|---|---|---|---|
| | 1 | 2 | 3 | 4 | 5 | 6 |
| Lauroyl peroxide, percent by wt | 0.7 | 0.9 | 1.1 | 1.1 | 1.3 | 1.5 |
| Rel. visc | 3.34 | 3.22 | 3.04 | 3.01 | 2.88 | 2.74 |
| Izod impacts, ft./lbs./in. notch: | | | | | | |
| Inj | 1.11 | 2.36 | 3.61 | 4.38 | 4.40 | 3.14 |
| Comp | 0.64 | 2.53 | 4.76 | 5.57 | 5.66 | 4.82 |
| Tensile Strength, (p.s.i.), yield: | | | | | | |
| Inj | 8,040 | 7,687 | 7,230 | 7,363 | 6,740 | 6,130 |
| Comp | None | 6,308 | 5,892 | 6,598 | 5,223 | 4,770 |
| Fail: | | | | | | |
| Inj | 6,973 | 6,897 | 6,617 | 6,467 | 6,425 | 6,407 |
| Comp | 6,265 | 5,736 | 5,220 | 5,802 | 4,660 | 4,364 |
| Elongation, percent, yield: | | | | | | |
| Inj | 2.97 | 2.80 | 2.69 | 2.85 | 2.86 | 2.66 |
| Comp | None | 2.52 | 2.27 | 2.26 | 2.08 | 2.03 |
| Fail: | | | | | | |
| Inj | 31.5 | 32.0 | 30.7 | 32.1 | 35.7 | 43.0 |
| Comp | 2.04 | 4.98 | 10.7 | 7.8 | 3.2 | 9.1 |
| Elastic modulus, (p.s.i.) $\times 10^5$: | | | | | | |
| Inj | 3.69 | 3.79 | 3.64 | 3.56 | 3.30 | 3.39 |
| Comp | 3.74 | 3.46 | 3.35 | 3.73 | 3.16 | 3.02 |

TABLE 2

| | Run C | | | | |
|---|---|---|---|---|---|
| | 7 | 8 | 9 | 10 | 11 |
| Lauroyl peroxide, percent | 0.9 | 1.1 | 1.3 | 1.3 | 1.7 |
| Relative viscosity in cyclohexanone at 25° C. (0.5000 g. in 50 ml.) | 2.70 | 2.64 | 2.55 | 2.53 | 2.42 |
| Molded, Izod impact, (ft. lbs./inch notch): | | | | | |
| Inj | 2.30 | 3.01 | 3.66 | 3.76 | 3.18 |
| Comp | 1.88 | 4.06 | 3.97 | 5.66 | 4.29 |
| Tensile strength, p.s.i., yield: | | | | | |
| Inj | 7,323 | 7,113 | 6,527 | 7,040 | 6,050 |
| Comp | 6,196 | 5,985 | 5,375 | 5,600 | 4,492 |
| Fail: | | | | | |
| Inj | 6,490 | 6,373 | 5,923 | 6,357 | 6,087 |
| Comp | 5,910 | 5,136 | 4,849 | 5,442 | 4,186 |
| Elongation, percent, yield: | | | | | |
| Inj | 2.56 | 2.54 | 2.58 | 2.55 | 2.59 |
| Comp | 2.00 | 2.16 | 2.39 | 2.2 | 2.1 |
| Elastic modulus $\times 10^5$, p.s.i.: | | | | | |
| Inj | 3.90 | 3.70 | 3.80 | 3.84 | 3.27 |
| Comp | 3.86 | 3.72 | 3.02 | 3.14 | 2.63 |

The above runs are repeated employing (1) caprylyl peroxide, decanoyl peroxide, and myristoyl peroxide, respectively, as initiator instead of lauroyl peroxide; (2) equimolar amounts of methacrylonitrile instead of acrylonitrile; and/or (3) equal weight amounts of polybutadienes having 2.7% of 1,2-addition content and about 95% cis content and having about 8% of 1,2-addition content and about 35% of cis content, respectively, instead of the SBR rubber. Desired results are also obtained.

What is claimed is:

1. A two-step process for the production of high impact, solvent resistant polymer comprising; polymerizing a mixture of:
(A) about 60 to 80 parts by weight of at least one monovinyl aromatic compound,
(B) about 20 to about 40 parts by weight of at least one compound of the formula $$H_2C=\overset{R}{\underset{|}{C}}-CN$$

in which R is selected from the group consisting of hydrogen and methyl; and
(C) about 5 to about 30 parts by weight of a butadiene rubbery polymer;

in the presence of from 1.1 to about 1.5% by weight, based on the combined weight of A, B, and C, of a dialkacyl peroxide in which the alkacyl radical has 8 to 16 carbon atoms, and from about 0.05% to about 0.5% by weight based on the total monomer-rubbery polymer weight of unsaturated alpha-methylstyrene dimers; the first step consisting of polymerizing in bulk at a temperature of from 65° to 110° C. until from about 5 to about 40% by weight of A and B are polymerized, and the second step consisting of forming an aqueous suspension of the bulk polymerizate and polymerizing the polymerization mixture in suspension at a temperature of from 65° to 110° C. until at least 70% by weight of A and B are polymerized.

2. A process according to claim 1 in which A is styrene, B is acrylonitrile, and C is a rubbery butadiene polymer.

3. A process according to claim 1 in which A is styrene, B is acrylonitrile, and C is an SBR rubber.

4. A process according to claim 1 in which the dialkacyl peroxide is lauroyl peroxide.

5. A process according to claim 1 in which the first and second polymerization steps are conducted at a temperature within the range of from about 70° C. to about 95° C.

6. A process according to claim 1 in which A is styrene, B is acrylonitrile, C is a rubbery butadiene polymer, the dialkacyl peroxide is lauroyl peroxide, and the first and second polymerization steps are conducted at a temperature within the range of from about 70° C. to about 95° C.

References Cited
UNITED STATES PATENTS

| | | | |
|---|---|---|---|
| 1,337,325 | 8/1963 | Grant | 260—880 |
| 2,694,692 | 11/1954 | Amos et al. | 260—880 |
| 3,210,304 | 10/1965 | Eirich et al. | |
| 3,311,675 | 3/1967 | Doak et al. | 260—880 |
| 3,325,457 | 6/1967 | Finestone et al. | |
| 3,370,105 | 2/1968 | De Bell et al. | 260—880 |
| 3,243,481 | 3/1966 | Ruffing et al. | 260—880 |
| 3,448,175 | 6/1969 | Doak et al. | 260—880 |

MURRAY TILLMAN, Primary Examiner

C. J. SECCURO, Assistant Examiner

U.S. Cl. X.R.

260—29.7